US010705735B2

(12) United States Patent
He et al.

(10) Patent No.: US 10,705,735 B2
(45) Date of Patent: Jul. 7, 2020

(54) METHOD AND DEVICE FOR MANAGING HASH TABLE, AND COMPUTER PROGRAM PRODUCT

(71) Applicant: EMC IP Holding Company LLC, Hopkinton, MA (US)

(72) Inventors: Zhe He, Beijing (CN); Lei Gao, Beijing (CN); Hao Fang, Beijing (CN); Zhiqiang Li, Beijing (CN); Huan Chen, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 7 days.

(21) Appl. No.: 16/249,376

(22) Filed: Jan. 16, 2019

(65) Prior Publication Data
US 2019/0220190 A1 Jul. 18, 2019

(30) Foreign Application Priority Data
Jan. 18, 2018 (CN) .......................... 2018 1 0048717

(51) Int. Cl.
*G06F 12/00* (2006.01)
*G06F 3/06* (2006.01)
(52) U.S. Cl.
CPC ............ *G06F 3/061* (2013.01); *G06F 3/0655* (2013.01); *G06F 3/0679* (2013.01)
(58) Field of Classification Search
None
See application file for complete search history.

(56) References Cited

U.S. PATENT DOCUMENTS

| 8,397,051 | B2* | 3/2013 | Beaman | G06F 16/2255 711/216 |
|---|---|---|---|---|
| 8,874,842 | B1* | 10/2014 | Kimmel | G06F 3/0611 711/114 |
| 2013/0114414 | A1* | 5/2013 | Song | H04L 47/34 370/237 |
| 2014/0188885 | A1* | 7/2014 | Kulkarni | G06F 16/9014 707/739 |
| 2017/0286004 | A1* | 10/2017 | Hu | G11C 29/808 |
| 2018/0152200 | A1* | 5/2018 | Guilford | G06F 3/0647 |

* cited by examiner

*Primary Examiner* — John A Lane
(74) *Attorney, Agent, or Firm* — BainwoodHuang

(57) ABSTRACT

Techniques manage a hash table, and a computer program product. The techniques involve: in response to receiving a write request, determining whether a first hash value associated with the write request is stored in a Haidian District set of hash tables, the set of hash tables including at least a first hash table and a second hash table, the first hash table being a currently valid hash table for the first storage device, the second hash table being stored in a second storage device, an access speed of the first storage device being faster than that of the second storage device; in response to determining that the first hash value is not stored in the set of hash tables and the first hash table is full, setting a pre-allocated third hash table in the first storage device as the currently valid hash table in the first storage device; writing a first entry into the third hash table, the first entry including the first hash value; and merging entries in the first hash table with entries in the second hash table for storage into the second storage device. With such techniques, a two-level hash table structure is built, and the hash table management efficiency is improved.

21 Claims, 5 Drawing Sheets

METHOD AND DEVICE FOR MANAGING HASH TABLE, AND COMPUTER PROGRAM PRODUCT

FIELD

Embodiments of the present disclosure relate to the field of data storage, and more specifically to a method and apparatus for managing a hash table, and a computer program product.

BACKGROUND

As the information era comes, data to be stored increases exponentially. Elimination of redundancy is utilized more and more widely to reduce storage overhead and improve storage efficiency. The elimination of redundancy means that new redundancy data would not be inserted if the data has already been stored in a storage device.

At present, typically, a hash table is managed in a memory to enable quick determination of whether the data is redundant, thereby avoiding a repeated write of the data. However, when the capacity of a rear-end storage is very large, the scale of the hash table is limited by the capacity of the memory. Therefore, how to effectively manage the hash table becomes a focus of concerns.

SUMMARY

Embodiments of the present disclosure provide a solution of managing a hash table According to a first aspect of the present disclosure, there is provided a method of managing a hash table. The method comprises: in response to receiving a write request, determining whether a first hash value associated with the write request is stored in a set of hash tables, the set of hash tables including at least a first hash table and a second hash table, the first hash table being a currently valid hash table in the first storage device, the second hash table being stored in a second storage device, an access speed of the first storage device being faster than that of the second storage device; in response to determining that the first hash value is not stored in the set of hash tables and the first hash table is full, setting a pre-allocated third hash table in the first storage device as the currently valid hash table for the first storage device; writing a first entry into the third hash table, the first entry including the first hash value; and merging the hash value in the first hash table with the hash value in the second hash table for storage into the second storage device.

According to a second aspect of the present disclosure, there is provided an apparatus for managing a hash table. The apparatus comprises: at least one processing unit; and at least one memory. The at least one memory is coupled to the at least one processing unit and stores instructions to be executed by the at least one processing unit. The instructions, when executed by the at least one processing unit, cause the apparatus to perform acts, the acts including: in response to receiving a write request, determining whether a first hash value associated with the write request is stored in a set of hash tables, the set of hash tables including at least a first hash table and a second hash table, the first hash table being a currently valid hash table in the first storage device, the second hash table being stored in a second storage device, an access speed of the first storage device being faster than that of the second storage device; in response to determining that the first hash value is not stored in the set of hash tables and the first hash table is full, setting a pre-allocated third hash table in the first storage device as the currently valid hash table for the first storage device; writing a first entry into the third hash table, the first entry including the first hash value; and merging the hash value in the first hash table with the hash value in the second hash table for storage into the second storage device.

According to a third aspect of the present disclosure, there is provided a computer program product that is tangibly stored on a computer readable medium and includes machine-executable instructions. The machine-executable instructions, when being executed, cause the machine to execute any step of the method described according to the first aspect of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the identical reference symbols refer to the identical elements in example embodiments of the present disclosure.

DETAILED DESCRIPTION OF EMBODIMENTS

Figure 1:
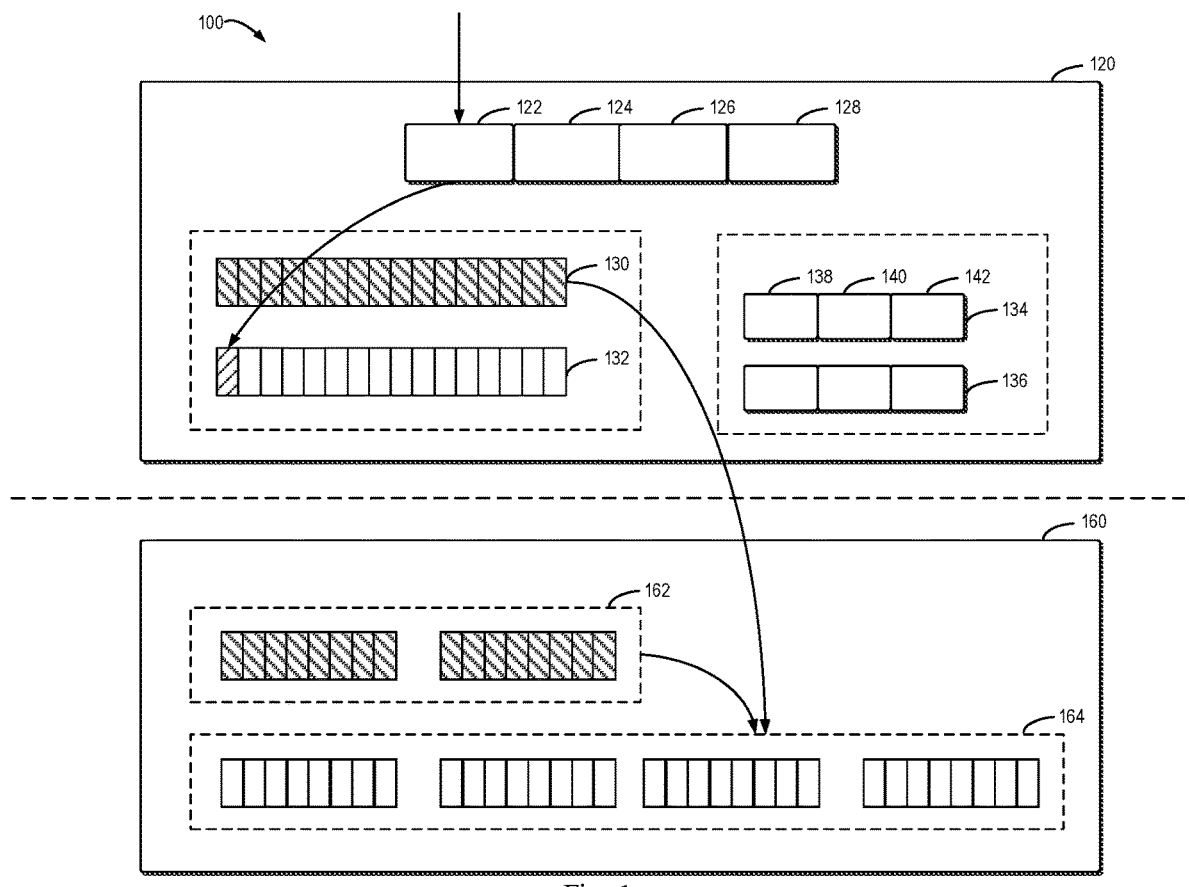
FIG. 1 illustrates a schematic diagram of a hash table storage framework according to embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

As described above, according to a conventional hash table management scheme, the hash table is managed in the memory. However, as the capacity of a primary storage device increases abruptly, the size of the hash table for use in the primary storage device will be too large to be maintained in the memory. For example, regarding 200 TB data, around 1 TB space will be needed to store all hash entries, which is an unacceptable data scale for the memory.

In order to at least partly solve the above and other potential problems, example embodiments of the present disclosure provide a solution for managing a hash table. According to various example embodiments of the present disclosure, a two-level hash table storage structure is built, wherein a first-level hash table may be maintained in a high-speed storage device (e.g., a memory), and a second-level hash table may be maintained in a sub-high-speed storage device (e.g., a solid-state drive SSD). In this manner, a drawback of limited space in the memory will be overcame, and an advantage of a large storage space and a faster access speed of SSD will be employed. In addition, only when the first-level hash table is full, the values in the first-level hash table would be merged into the second-level hash table. In this manner, a random write operation for the second storage device in the conventional technology is transformed into a continuous write operation, thereby prolonging the service life of the second storage device.

The method of managing the hash table according to the present disclosure will be described in detail below with reference to FIG. 1 to FIG. 5. FIG. 1 illustrates a schematic diagram of a hash table storage framework 100 according to embodiments of the present disclosure.

As shown in FIG. 1, the storage framework 100 comprises a first storage device 120 and a second storage device 160. In some embodiments, an access speed of the first storage device 120 is faster than that of the second storage device 160. In some embodiments, for example, the first storage device 120 may be a random access memory, and the second storage device 160 may be a SSD.

In some embodiments, in the first storage device 120, one or more buckets 122, 124, 126 and 125 are provided. Then each I/O-related hash value operation is able to be allocated to different buckets and performed therein according to specific bits of the hash value, thereby implementing concurrent operation of a plurality of hash values and improving the level of parallel handling of hash table management.

In some embodiments, in the first storage device 120, at least one hash table 130 which has a plurality of entries is provided, wherein each entry includes a hash value associated with the I/O request. In some embodiments, in the first storage device 120, another hash table 132 which cooperates with the hash table 130 is further provided. When the hash table 130 is already full, hash value will be written into the hash table 132, and the hash table 130 will be marked as "read only". Similarly, when the hash table 132 is already full, the hash table 130 may be set as the currently valid hash table for the first storage device 120 to store the hash value related to the I/O request.

In some embodiments, in the second storage device 160, at least one hash table 162 is provided, implementing transferring entries in the full hash table 130 in the first storage device 120 into the second storage device 160. In some embodiments, in the second storage device 160 is further provided a hash table 164. When the hash table 162 is full, entries in the hash table 130 and hash table 162 will be transferred into the hash table 164.

In some embodiments, in the first storage device 120, index items 134 and 136 are further provided, which are associated with the hash tables 162 and 164 in the second storage device 160, for implementing quick look-up of hash values in the hash tables 162 and 164 in the second storage device 160. In some embodiments, the index item 134 may include a header 138, a bloom filter 140 and a page index 142, wherein the header 138 contains checksum, capacity, page count, entry count etc.; the bloom filter 140 is used to quickly determine whether a certain hash value is stored in the hash table 162, as will be described in detail below; the page index 142 stores start locations and offset quantity of a plurality of pages in each hash table.

Figure 2:
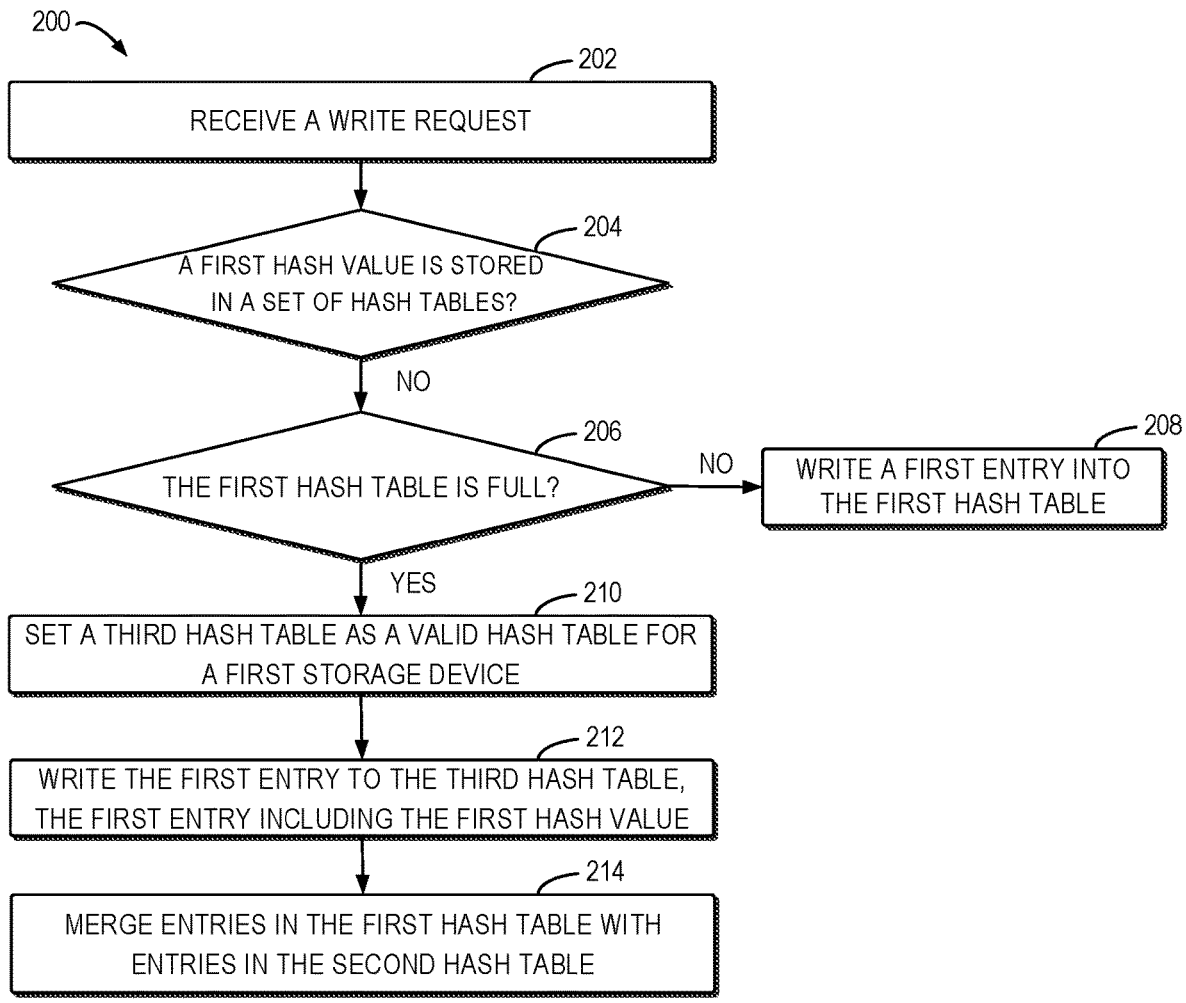
FIG. 2 illustrates a flow chart of a method of managing a hash table according to embodiments of the present disclosure.

Reference is made below to FIG. 2 which illustrates a flow chart of a method 200 of managing a hash table according to embodiments of the present disclosure. In block 202, the storage framework receives a write request. In block 204, the storage framework determines whether a hash value (hereinafter referred to as a first hash value for ease of description) associated with the write request is stored in the set of hash tables.

In some embodiments, each hash value may be sent to a different bucket as shown in FIG. 1. As the hash value itself has excellent randomness, the bucket to which the hash value is sent may be determined based on values of specific bits of the hash value. For example, if 128 buckets are provided in the framework, the bucket associated with the hash value may be determined based on the first 6 bits of the hash value. For example, if the values of the first six bits are 000010, the hash value will then be sent to the second bucket. In this manner, it is possible to concurrently operate a plurality of hash values, without conflicts happening. It should be appreciated that there is the same multi-level hash table structure in each bucket 122, 124, 126 and 128, and the operations thereof are consistent.

Hence, fore ease of description, operation of one of the bucket is taken as an example and described below. For example, as shown in FIG. 1, the first hash value is associated with the bucket 122, so it may be determined that the corresponding set of hash tables includes the hash table 130 (hereinafter referred to as the first hash table for ease of description), the hash table 162 (hereinafter referred to as the second hash table for ease of description) and the hash table 164 (hereinafter referred to as the fourth hash table for ease of description), wherein the first hash table is a currently valid hash table for the first storage device 120. It should be appreciated that the specific number of hash tables in the preceding text is only by way of example.

Figure 3:
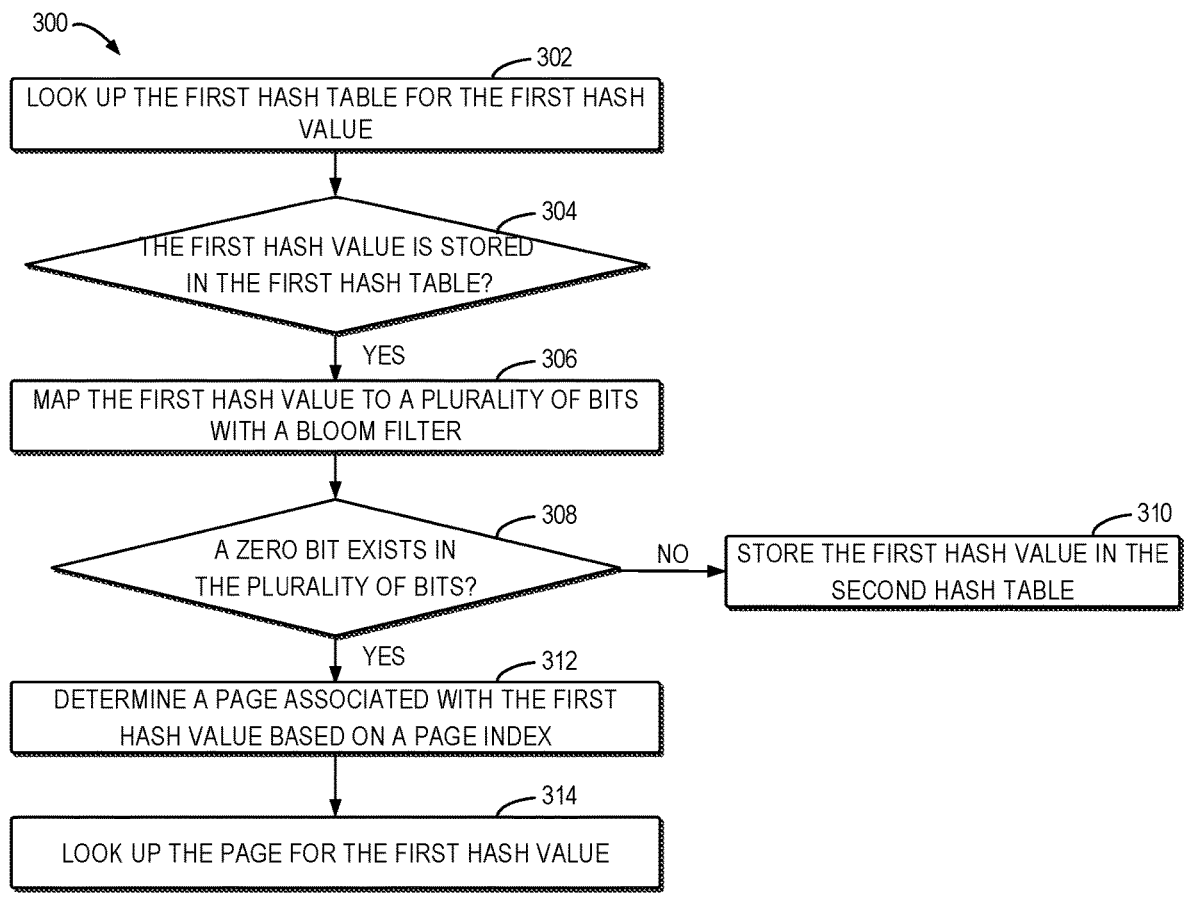
FIG. 3 illustrates a flow chart of a method of determining whether a hash value is stored in a set of hash tables according to embodiments of the present disclosure.

A specific implementation of block 204 will be described below with reference to FIG. 3. FIG. 3 illustrates an example implementation mode 300 of a method of determining whether a hash value is stored in a set of hash tables according to embodiments of the present disclosure.

In block 302, the storage framework look ups the first hast table 130 for the first hash value, and determines whether the first value is stored in the first hash table 130 in block 304. If the first hash value is found in the first hash table 130, this indicates that the data has already been stored and therefore a write operation is not needed any longer. If the first hash value is not found in the first hash table 130, the method 300 proceeds to block 306.

In block 306, the storage framework map the first hash value to a plurality of bits with the bloom filter associated with the second hash table, and in block 308 whether any zero bit exists in the plurality of bits is determined. The bloom filter is used to determine whether one element is in a data structure in a certain set. One empty bloom filter is a bit array having M bits, wherein each bit is initialized as 0 and a plurality of different hash functions are defined. Each hash function hashes elements in the set to one of M different bits, and the value of the plurality of bits is set as 1.

In some embodiments, as stated above, the bloom filter 134 is located in the first storage device 120, rather than in the second storage device 160. In this manner the first storage device 120 with the faster access speed can be used to determine that some hash values do not exist in the second hash table 162 without accessing the second storage device 160, thereby greatly improving the look-up efficiency.

As shown in FIG. 1, when the first hash value is queried, a plurality of hash functions in the bloom filter 142 associated with the second hash table 162 are used to map the first has value to a plurality of bits. If it is determined that a zero bit exists in the plurality of bits in block 308, the method 300 proceeds to block 310, namely, determining that the first hash value is not stored in the second hash table 162. At this time, the storage framework may continue to query with respect to next hash table (e.g., the fourth hash table 164) in the set of hash tables, with a query method similar to the second hash table 162, which would not be detailed herein.

If it is determined in block 308 that no zero bit exists in the plurality of bits, this indicates that the first hash value might exist in the second hash table 162, and the method 300 proceeds to the block 312, namely, determining a page associated with the first hash value based on the page index 142. In some embodiments, as stated above, the page index 142 stores starting hash values and offset quantity of pages in the second hash table, thereby quickly positioning the hash table page which is corresponding to the first hash value. The storage framework looks up the corresponding page for the first hash value in block 314. In some embodiments, as shown in FIG. 1, the page index 142 may be stored in the first storage device 120.

Further referring to FIG. 2, if it is determined in block 204 that the first hash value is not stored in the set of hash tables, the method proceeds to block 206, i.e., determining whether the first hash table 130 is full. If the first hash table 130 is not yet full, the method 200 proceeds to block 208, namely, writing the first entry into the first hash table 130, wherein the first entry including the first hash value.

In some embodiments, it is also feasible to provide a log buffer in a NVRAM (Non-Volatile Random Access Memory). The entry may be also wrote into the log upon being wrote into the hash table, and entries of the log buffer will be added into the hash table log located in the second storage device 160 when the buffer is full. The employment of the log management mechanism may effectively avoid risks such as sudden power off and data loss, support data restoration and improve the safety of data storage.

If it is determined in block 206 that the first hash table is full, the method 200 proceeds to block 210. In block 210, the third hash table 132 is set as the currently valid hash table for the first storage device 120. In some embodiments, the third hash table 132 may be a pre-allocated storage area in the first storage device 120. In some embodiments, it is feasible to temporarily apply for a storage area of a predetermined size as the third hash table 132.

In block 212, the first entry including the first hash value is written into the third hash table 132. And in block 215, the storage framework merges the entries in the first hash table 130 with the entries in the second hash table 162.

In some embodiments, it may be first determined whether a sum of number of entries in the first hash table 130 and the number of entries in the second hash table 162 reaches a predetermined threshold, wherein the predetermined threshold may be a maximum number of entries which can be stored in the second hash table 162. If the sum is less than the predetermined threshold, this indicates that the remaining space in the second hash table 162 is sufficient to accommodate entries of the first hash table 130. Then the storage framework may rewrite the entries in the first hash table 130 and entries in the second hash table 162 into the second hash table 162, for example in an ascending order of the hash values, and update the index item 134 associated with the second hash table.

In some embodiments, if the sum reaches the predetermined threshold, this indicates that the remaining space in the second hash table 162 is not sufficient to accommodate entries of the first hash table 130. Then the storage framework need to merge the entries into a new fourth hash table 164. In this case, to the storage framework may write the entries in the first hash table 130 and entries in the second hash table 162 into the fourth hash table 164, for example in an ascending order of the hash values, and update the index item 136 associated with the fourth hash table. In some embodiments, the fourth hash table 164 may be pre-allocated in the second storage device 160. In some embodiments, it is also feasible to temporarily apply for a storage space of a predetermined size in the second storage device 160 as the fourth hash table 164. In some embodiments, after completion of the merge, the second hash table 162 may be set as writeable such that it may be reused. In some embodiments, after completion of the merge, the second hash table 162 may also be directly released.

In some embodiments, after completion of the merge of the entries in the first hash table 130 and entries in the second hash table 162, the first hash table 130 may be set as writeable such that it may be reused. In some embodiments, the first hash table 130 may also be directly released.

According to embodiment of the present disclosure, the merge of the first hash table 130 and second hash table 162 is performed asynchronously. Dual hash tables in the first memory 120 are employed without locking the hash tables in the first memory 120, thereby ensuring that new write requests can be responded to in time. Besides, continuous and discrete small data writes are transformed into a continuous large data write by merging operation, thereby prolonging the service life of the second storage device 160.

In some embodiments, only one layer of hash structure (e.g., the second hash table 162) is provided in the second storage device 160, and the capacity of the second hash table 162 may be large enough. It is assumed that the capacity of the second hash table 162 is N times that of the first hash table 130 and the capacity of the first hash table 130 is the same as the capacity of one page in the second hash table 162. If the hash table in the first storage device 110 is full, it needs to be merged with the second hash table 162. During each merge operation, it is necessary to read all entries in the second hash table 162, and to rewrite the merged entries into the second hash table. Therefore, if data of N pages is to be written, N merge operations need to be performed, thereby performing I/O operations of N*N* pages. The I/O efficiency is relatively lower and unacceptable.

Preferably, in some embodiments, multi-levels of hash tables, for example, set m layers of hash tables, may be provided in the second storage device 160. In addition, for ease of the merging operation, the capacity of a lower layer of hash table is usually set as n times that of an upper layer of hash table, and the capacity of the second hash table 162 may be n times that of the first hash table 130. Likewise, it is assumed that the capacity of the first hash table 130 is the same as one page in the second hash table 162. In this matter, for example, the number of I/O operations to be performed for writing $N_m$ pages of data is: $N_m*((n-1)*m+1)$, wherein $N_m=n^m$, which is the number of pages in the $m^{th}$ layer.

Take the writing of data of 64 pages as an example. If a single-layer manner is employed, I/O operations of 64*64 pages need to be performed. If a multi-layer (e.g., three-layer) design is employed, wherein the lower layer has a capacity four times that of the upper layer, data of 64*((4−1)*3+1)=64*10 pages are only needed upon writing data of 64 pages. It can be seen that the hash table structure based on multi-layer design can substantially reduce the number of I/O operations performed during merge operations, thereby remarkably improving the efficiency of hash table operations.

Figure 4:
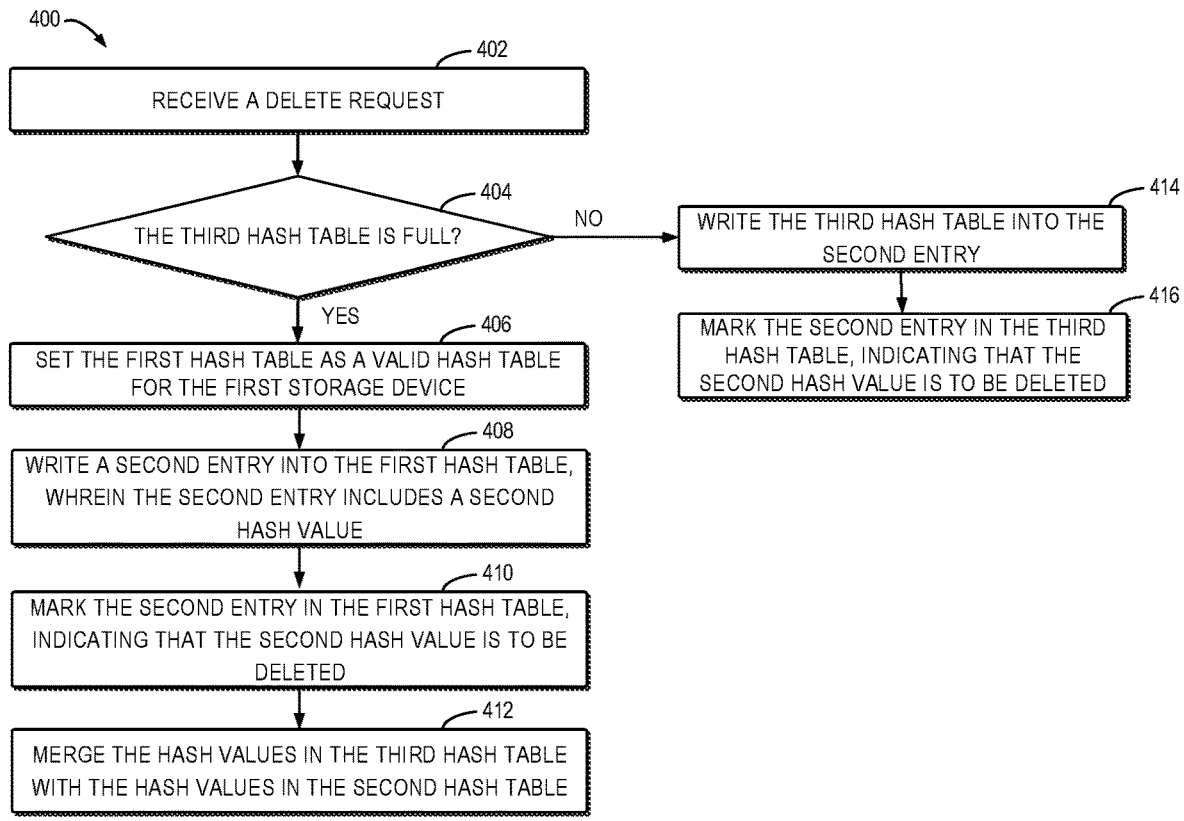
FIG. 4 illustrates a flow chart of another method of managing a hash table according to embodiments of the present disclosure.
Figure 5:
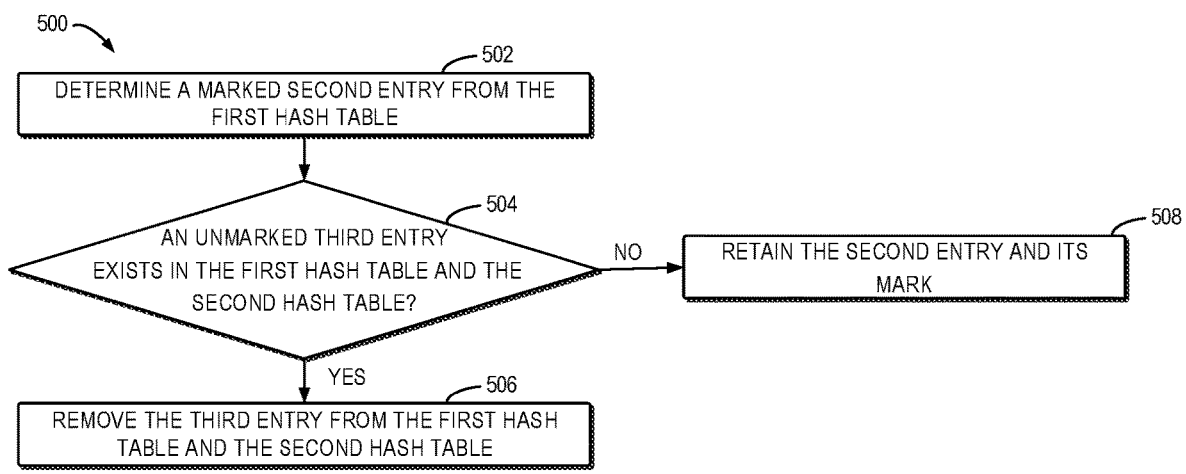
FIG. 5 illustrates a flow chart of a method of deleting a hash value according to embodiments of the present disclosure.

Reference is made to FIG. 4 to describe another method of managing a hash table according to embodiments of the present disclosure. In block 402, a delete request is received, and in block 404, it is determined whether the currently valid third hash table 132 for the first storage device 120 is full.

If it is determined in block 404 that the third hash table 132 is not yet full, the method 400 proceeds to block 414, namely, writing a second entry into the third hash table 132, the second entry including a second hash vale associated with the delete request. In block 416, the second entry is marked in the third hash table, indicating that the second hash value is to be deleted.

If it is determined in block 404 that the third hash table 132 is full, the method 400 proceeds to block 406, namely, setting the first hash table 130 as the currently valid hash table for the first storage device 120. In some embodiments, it is also possible to temporarily apply for a new hash table from the first storage device 120 as the currently valid hash table.

In block 408, the second entry is written into the first hash table 130, and in block 410, the second entry is marked in the first hash table indicating that the second hash value is to be deleted. And in block 412, the entries in the third hash table 132 are merged with the entries in the second hash table 162.

As stated above, the hash value to be deleted is only marked as a to-be-deleted state in the hash table, rather than to be deleted in real time, and the hash value will then be deleted during the merge operation. Hereunder, reference is made to FIG. 5 to describe a flow chart of a method 500 of deleting a hash value according to embodiments of the present disclosure.

In block 502, the marked second entry is determined from the first hash table, wherein the second entry includes the second hash value. In block 504, it is determined whether an unmarked third entry exists in the first hash table and second hash table, wherein the third entry also includes the second hash value. If the third entry exists in the third hash table or the second hash table, the method 500 proceeds to block 506, namely, deleting the second entry and third entry from the first hash table or second hash table. In some embodiments, when the third entry is deleted, the storage space associated with the second hash value may be released from the storage device.

If it is determined in block 504 that the third entry does not exist in the first hash table or second hash table, the method 500 proceeds to the block 508, namely, merging the first hash table with the second hash table with the method stated above, and retain the second entry and mark state thereof in the merging result.

With the above-described method, the hash value deletion operation may be, together with the hash value insertion operation, first written into the hash table in the first storage device 120, and the hash value in the first storage device 120 is to be merged with the hash table in the second storage device 160 only when the hash table is full. In this way, separate and random small write/delete operations may be transformed into a continuous large write/delete operation, thereby improving the operation efficiency of the hash table and prolonging the service life of the second storage device 160.

Figure 6:
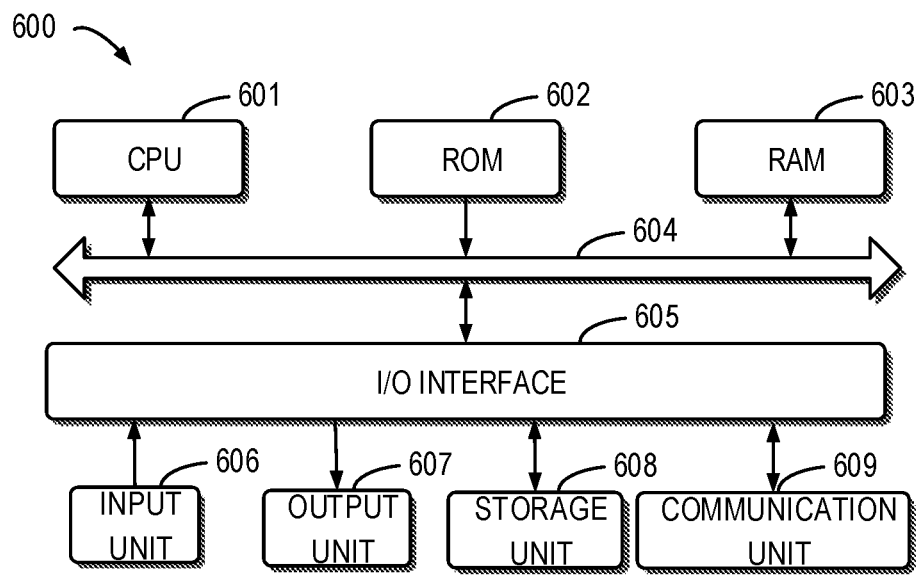
FIG. 6 illustrates a schematic block diagram of an example apparatus which can be used to implement embodiments of the present disclosure.

FIG. 6 is a schematic block diagram of an example apparatus that can be used to implement embodiments of the present disclosure. As shown in FIG. 6, the apparatus 600 comprises a central processing unit (CPU) 601 which is capable of performing various processes in accordance with computer program instructions stored in a read only memory (ROM) 602 or computer program instructions loaded from a storage unit 608 to a random access memory (RAM) 603. In the RAM 603 are stored various programs and data as required by operation of the apparatus 600. The CPU 601, the ROM 602 and the RAM 603 are connected to one another via a bus 604. An input/output (I/O) interface 606 is also connected to the bus 604.

The following components in the device 600 are connected to the I/O interface 605: an input unit 606 including a keyboard, a mouse, or the like; an output unit 606 such as various types of displays and speakers; the storage unit 608 such as a magnetic disk or optical disk; and a communication unit 609 such as a network card, a modem, a wireless communication transceiver or the like. The communication unit 609 allows the device 600 to exchange information/data with other devices through a computer network such as the Internet and/or various types of telecommunication networks.

The processing unit 601 performs various method and processes described above, for example methods 200, 300, 400 and/or 500. For example, in some embodiments, the method 200, 300, 400 and/or 500 may be implemented as a computer software program or computer program product, which is tangibly contained in a machine-readable medium, for example the storage unit 608. In some embodiments, part or all of the computer program may be loaded and/or installed on the device 600 via ROM 602 and/or communication unit 609. When the computer program is loaded in the RAM 603 and executed by CPU 601, one or more acts of the method 200, 300, 400 and/or 500 described above may be executed.

The present disclosure may be a method, an apparatus, a system and/or a computer program product. The computer program product may include a computer readable storage medium (or media) having computer readable program instructions thereon for causing a processor to perform aspects of the present disclosure.

The computer readable storage medium may be a tangible device that may retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. Non-exhaustive and more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other electromagnetic waves propagating freely, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processing unit of the computer or other programmable data processing apparatus, create means (e.g., specialized circuitry) for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a hash table, comprising:
in response to receiving a write request, determining whether a first hash value associated with the write request is stored in a set of hash tables, the set of hash tables including at least a first hash table and a second hash table, the first hash table being a currently valid hash table for a first storage device, the second hash table being stored in a second storage device, an access speed of the first storage device being faster than that of the second storage device;
in response to determining that the first hash value is not stored in the set of hash tables and the first hash table is full, setting a pre-allocated third hash table in the first storage device as the currently valid hash table for the first storage device;
writing a first entry into the third hash table, the first entry including the first hash value; and
merging entries in the first hash table with entries in the second hash table for storage into the second storage device.

2. The method according to claim 1, wherein the merging entries in the first hash table with entries in the second hash table comprises:
determining whether a sum of a number of entries in the first hash table and a number of entries in the second hash table reaches a predetermined threshold; and
in response to the sum being smaller than the predetermined threshold, writing the entries in the first hash table and the entries in the second hash table into the second hash table in a descending order of the hash values.

3. The method according to claim 2, further comprising:
in response to the sum reaching the predetermined threshold, writing the entries in the first hash table and the entries in the second hash table into a pre-allocated fourth hash table in a descending order of the hash values.

4. The method according to claim 3, further comprising:
removing the first hash table from the first storage device.

5. The method according to claim 1, further comprising:
in response to receiving a delete request, determining whether the third hash table is full; and
in response to determining that the third hash table is not full, writing a second entry into the third hash table, the second entry including a second hash value associated with the delete request; and
marking the second entry in the third hash table to indicate that the second hash value is to be deleted.

6. The method according to claim 5, wherein the merging entries in the first hash table with entries in the second hash table comprises:
determining whether an unmarked third entry exists in the first hash table and the second hash table, the third entry including the second hash value; and
in response to the third entry existing in the third hash table or the second hash table, deleting the second entry and the third entry from the first hash table or the second hash table.

7. The method according to claim 1, wherein the determining whether a first hash value is stored in a set of hash tables comprises:
determining whether the first hash value is stored in the first hash table;
in response to the first hash value being not stored in the first hash table, mapping the first hash value to a plurality of bits with a bloom filter, the bloom filter being associated with the second hash table; and
in response to determining that a zero bit exists in the plurality of bits, determining that the first hash value is not stored in the second hash table.

8. The method according to claim 7, further comprising:
in response to determining that there is no zero bit in the plurality of bits, determining a page in the second hash table associated with the first hash value based on a page index, the page index being stored in the first storage device; and
querying for the first hash value from the page.

9. The method according to claim 7, wherein the bloom filter is stored in the first storage device.

10. The method according to claim 1, wherein before determining whether the first hash value is stored in the set of hash tables, the method further comprises:
determining, based on the first hash value, the set of hash tables associated with the first hash table from a plurality of sets of hash tables.

11. An apparatus for managing a hash table, comprising:
at least one processing unit;
at least one memory, the at least one memory is coupled to the at least one processing unit and stores instructions to be executed by the at least one processing unit, the instructions, when executed by the at least one processing unit, causing the apparatus to perform acts, the acts including:
in response to receiving a write request, determining whether a first hash value associated with the write request is stored in a set of hash tables, the set of hash tables including at least a first hash table and a second hash table, the first hash table being a currently valid hash table for a first storage device, the second hash table being stored in a second storage device, an access speed of the first storage device being faster than that of the second storage device,
in response to determining that the first hash value is not stored in the set of hash tables and the first hash table is full, setting a pre-allocated third hash table in the first storage device as the currently valid hash table for the first storage device,
writing a first entry into the third hash table, the first entry including the first hash value, and
merging entries in the first hash table with entries in the second hash table for storage into the second storage device.

12. The apparatus according to claim 11, wherein the merging entries in the first hash table with entries in the second hash table comprises:
determining whether a sum of a number of entries in the first hash table and a number of entries in the second hash table reaches a predetermined threshold; and
in response to the sum being smaller than the predetermined threshold, writing the entries in the first hash table and the entries in the second hash table into the second hash table in a descending order of the hash values.

13. The apparatus according to claim 12, the acts further comprising:
in response to the sum reaching the predetermined threshold, writing the entries in the first hash table and the entries in the second hash table into a pre-allocated fourth hash table in a descending order of the hash values.

14. The apparatus according to claim 13, the acts further comprising:
removing the first hash table from the first storage device.

15. The apparatus according to claim 11, the acts further comprising:
in response to receiving a delete request, determining whether the third hash table is full; and
in response to determining that the third hash table is not full, writing a second entry into the third hash table, the second entry including a second hash value associated with the delete request; and
marking the second entry in the third hash table to indicate that the second hash value is to be deleted.

16. The apparatus according to claim 15, wherein the merging entries in the first hash table with entries in the second hash table comprises:
determining whether an unmarked third entry exists in the first hash table and the second hash table, the third entry including the second hash value; and
in response to the third entry existing in the third hash table or the second hash table, deleting the second entry and the third entry from the first hash table or the second hash table.

17. The apparatus according to claim 11, wherein the determining whether a first hash value is stored in a set of hash tables comprises:
determining whether the first hash value is stored in the first hash table;
in response to the first hash value being not stored in the first hash table, mapping the first hash value to a plurality of bits with a bloom filter, the bloom filter being associated with the second hash table; and
in response to determining that a zero bit exists in the plurality of bits, determining that the first hash value is not stored in the second hash table.

18. The apparatus according to claim 17, the acts further comprising:
in response to determining that there is no zero bit in the plurality of bits, determining a page in the second hash table associated with the first hash value based on a page index, the page index being stored in the first storage device; and
querying for the first hash value from the page.

19. The apparatus according to claim 17, wherein the bloom filter is stored in the first storage device.

20. The apparatus according to claim 11, wherein before determining whether the first hash value is stored in the set of hash tables, the acts further comprise:
determining, based on the first hash value, the set of hash tables associated with the first hash table from a plurality of set of hash tables.

21. A computer program product having a non-transitory computer readable medium which stores a set of instructions for managing a hash table; the set of instructions, when carried out by computerized circuitry, causing the computerized circuitry to perform a method of:
in response to receiving a write request, determining whether a first hash value associated with the write request is stored in a set of hash tables, the set of hash tables including at least a first hash table and a second hash table, the first hash table being a currently valid hash table for a first storage device, the second hash table being stored in a second storage device, an access speed of the first storage device being faster than that of the second storage device;
in response to determining that the first hash value is not stored in the set of hash tables and the first hash table is full, setting a pre-allocated third hash table in the first storage device as the currently valid hash table for the first storage device;
writing a first entry into the third hash table, the first entry including the first hash value; and
merging entries in the first hash table with entries in the second hash table for storage into the second storage device.

* * * * *